Aug. 18, 1925.
F. E. PATTERSON
CULTIVATOR ATTACHMENT
Filed May 20, 1924
1,550,225
2 Sheets-Sheet 1
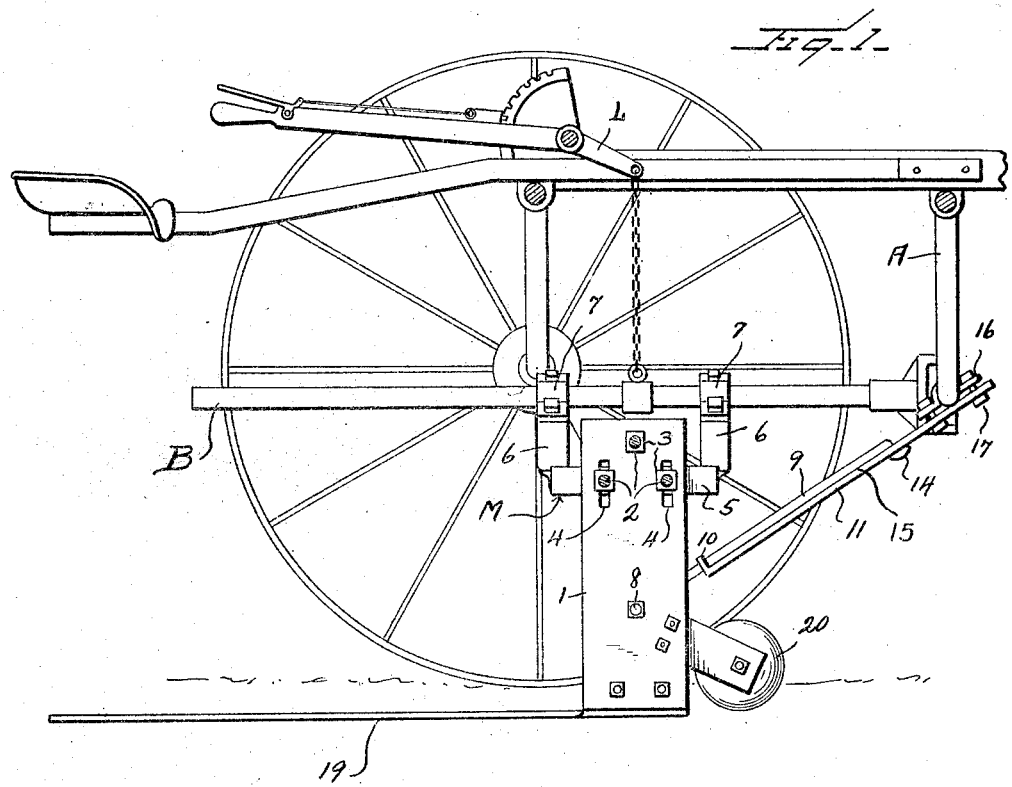
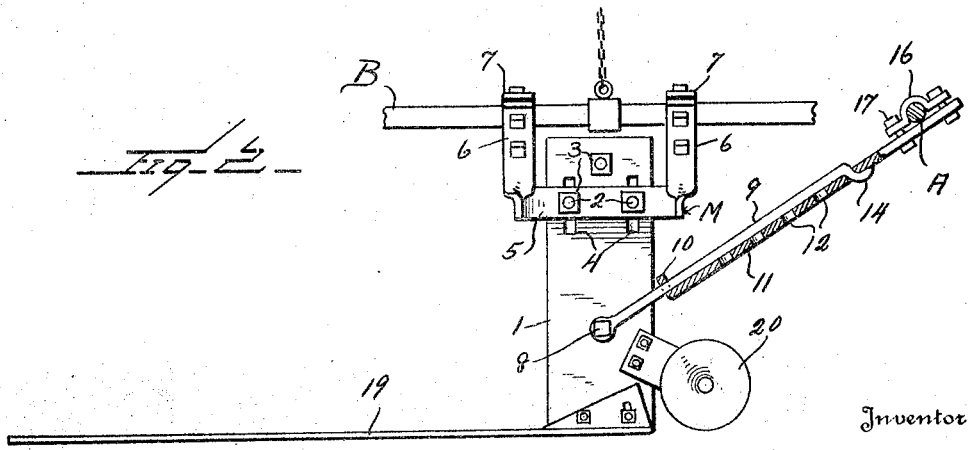
Inventor
F. E. Patterson
By Watson E. Coleman
Attorney Aug. 18, 1925.　　　　　　　　　　　　　　　1,550,225
F. E. PATTERSON
CULTIVATOR ATTACHMENT
Filed May 20, 1924　　　　2 Sheets-Sheet 2
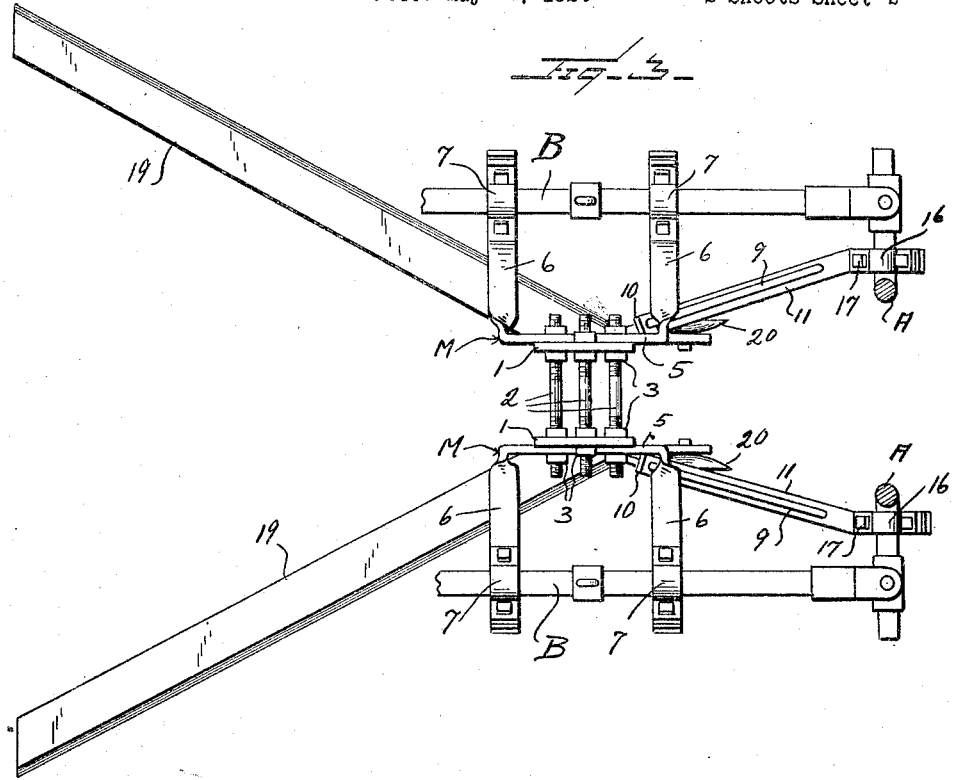
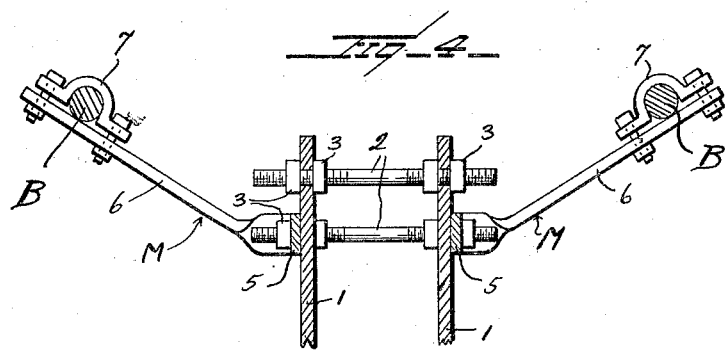
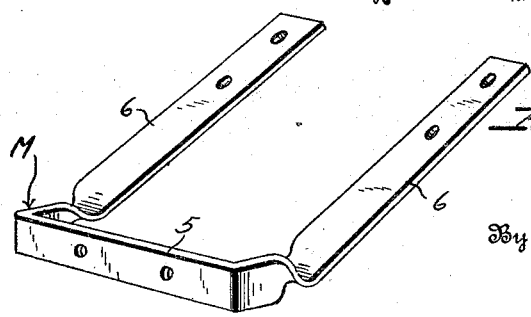
Inventor
F.E.Patterson
By Watson E. Coleman
Attorney Patented Aug. 18, 1925.

1,550,225

UNITED STATES PATENT OFFICE.

FRANK E. PATTERSON, OF LAMESA, TEXAS.

CULTIVATOR ATTACHMENT.

Application filed May 20, 1924. Serial No. 714,643.

*To all whom it may concern:*

Be it known that I, FRANK E. PATTERSON, a citizen of the United States, residing at Lamesa, in the county of Dawson and State of Texas, have invented certain new and useful Improvements in Cultivator Attachments, of which the following is a specification, reference being had to the accompanying drawings.

This invention relates to certain improvements in cultivator attachments and has relation more particularly to a device of this kind which is particularly intended for use in cultivating cotton, corn and the like in its early state, and it is an object of the invention to provide such an attachment with novel and improved means whereby the same may be readily engaged with the beams of a cultivator of the ordinary type and in a manner to effect such adjustments to permit the attachment to function with a maximum of efficiency.

Another object of the invention is to provide a novel and improved attachment having associated therewith securing means whereby in practice requisite pull is imposed upon the attachment from the front.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in side elevation and partly in section illustrating a cultivator attachment constructed in accordance with an embodiment of my invention and in applied position;

Figure 2 is a view in side elevation of my improved attachment with a part of one of the adjustable members in section;

Figure 3 is a view partly in top plan and partly in section of the structure illustrated in Figure 2;

Figure 4 is a transverse sectional view, with portions in elevation, taken through the structure as illustrated in Figure 3;

Figure 5 is a view in perspective of one of the U-shaped members unapplied.

As disclosed in the accompanying drawings, B denotes beams comprised in a wheel cultivator of a conventional type and which have their forward end portions operatively engaged with the arched cross member A.

My improved attachment comprises two elongated plates 1 arranged in parallelism and desired spaced relation, similar end portions of which being connected by the rods 2 arranged in triangular relation, each of said rods having threaded on each end portion and at opposite sides of a plate 1 the nuts 3 whereby the plates 1 are effectively maintained in desired assembled relation. The two lower rods 2 are substantially aligned in a direction transversely of the applied plates 1 and each of said plates is provided with the longitudinally disposed slots 4 through which said lower rods 2 pass whereby a longitudinal adjustment of the plates 1 may be effected as desired with respect to the holding members M directly associated with said lower rods 2.

Each of the holding members M is substantially U-shaped in form with its intermediate or base portion 5 angularly disposed with respect to the side arms 6 of such members, the lower rods 2 being disposed through said intermediate or base portions 5 to provide means whereby said members M and the plates 1 may be effectively secured one to the other.

In practice, the assembled plates 1 are positioned below and substantially midway between the beams B and the side arms 6 of the members M are of such a length to underlie and have contact with the beams B and also to extend a distance therebeyond. Bolted or otherwise secured to the outer end portions of the side arms 6 of the members M and straddling the beams from above are the cuffs 7 whereby said members M are effectively clamped to the beams B at desired positions therealong. By requisite loosening of the cuffs the members M and the connected plates 1 may be readily moved lengthwise of the beams B to the position desired.

Pivotally connected, as at 8, at a point in relatively close proximity to the end portion of each of the plates 1 remote from the rods 2 is an end portion of a rod 9, said rod 9 being freely disposed through an angularly disposed lip or flange 10 arranged at an end portion of an elongated flat member 11. The member 11 is provided with longitudinally spaced openings 12 in which are adapted to be selectively engaged the angular extension 14 carried by the outer end portion of the rod 9 to effect a relative adjustment between the rod 9 and the elongated member 15 as the occasions of practice may necessitate.

When my improved attachment is in applied position, the outer end portion of the member 15 underlies the cross member A and is held thereto by the cuffs 16 straddling said member A from above and bolted, as at 17, or otherwise secured to the member 15. By this arrangement direct pull is imposed upon the plates 1 from in front whereby the efficiency of the attachment is materially increased.

When my improved attachment is in applied position, the plates 1 are vertically disposed with the rods 2 uppermost and bolted or otherwise secured to the lower portion of each of the plates 1 is the forward portion of a blade 19, said blade extending rearwardly and outwardly on desired incline. To facilitate the requisite penetration of the blades 19, particularly when working on flat ground, each of the plates 1 at its lower portion and closely adjacent to but slightly above the blades 19 carries a disc 20 operating as an opener to facilitate the requisite functioning of the attachment said disc being positioned in advance of the plate.

The means as herein disclosed for connecting my improved attachment in applied position permits effective adjustment to increase the efficiency of the attachment and at the same time increases the durability thereof. It will also be understood that the improved attachment when in applied position may be raised or lowered as required through the instrumentality of the lifting means L associated with the beams B.

From the foregoing description it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the beams of a cultivator and a cross member associated therewith, an attachment comprising a pair of spaced plates, means for connecting the upper portions of the plates to the beams, means for connecting the lower portions of the plates to the cross member, blades carried by the plates, the means connecting the plates and the cross member each comprising a rod pivotally connected with the plate, an elongated member having a flange through which the rod is disposed, said elongated member having spaced openings, the rod having an angular extension selectively engaged within said openings, and means for holding the elongated member to the cross member.

2. In combination with the beams of a cultivator and a cross member associated therewith, an attachment comprising a pair of spaced plates, means for connecting the upper portions of the plates to the beams, means for connecting the lower portions of the plates to the cross member, blades carried by the plates, the means for connecting each of the plates to a beam comprising a substantially U-shaped member, means for connecting the extremities of said member to a beam, and means for securing the intermediate portion of the member to the plate.

3. In combination with the beams of a cultivator and a cross member associated therewith, an attachment comprising a pair of spaced plates, means for connecting the upper portions of the plates to the beams, means for connecting the lower portions of the plates to the cross member, blades carried by the plates, the means for connecting each of the plates to a beam comprising a substantially U-shaped member, means for connecting the extremities of said member to a beam, and means for securing the intermediate portion of the member to the plate, said plate being lengthwise adjustable with respect to the U-shaped member.

4. In combination with the beams of a cultivator and a cross member associated therewith, a pair of elongated plates, rods connecting adjacent end portions of said plates, U-shaped members, said rods coacting with the base portions of the U-shaped members to hold the same to the plates, means for securing the extremities of said U-shaped members to the beams, means for securing the plates to the cross member, and knives carried by the plates.

In testimony whereof I hereunto affix my signature.

FRANK E. PATTERSON.